(12) United States Patent
Bayar et al.

(10) Patent No.: US 8,862,358 B2
(45) Date of Patent: Oct. 14, 2014

(54) VEHICLE AND METHOD FOR CONTROLLING REGENERATIVE BRAKING

(71) Applicant: Ford Global Technologies, LLC, Dearborn, MI (US)

(72) Inventors: Kerem Bayar, Dearborn, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/837,657

(22) Filed: Mar. 15, 2013

(65) Prior Publication Data

US 2014/0277983 A1 Sep. 18, 2014

(51) Int. Cl.
*B60L 7/10* (2006.01)
*B60L 7/18* (2006.01)

(52) U.S. Cl.
CPC .................................... *B60L 7/18* (2013.01)
USPC ............................................. 701/71; 303/152

(58) Field of Classification Search
USPC ........................................... 701/71; 303/152
See application file for complete search history.

(56) References Cited

U.S. PATENT DOCUMENTS

| 5,511,866 | A | * | 4/1996 | Terada et al. | 303/152 |
| 5,539,641 | A | | 7/1996 | Littlejohn | |
| 5,615,933 | A | | 4/1997 | Kidston et al. | |
| 6,957,874 | B2 | | 10/2005 | Hara et al. | |
| 8,066,339 | B2 | | 11/2011 | Crombez et al. | |
| 2005/0017580 | A1 | * | 1/2005 | Cikanek et al. | 303/191 |
| 2012/0133202 | A1 | * | 5/2012 | Mui et al. | 303/152 |

FOREIGN PATENT DOCUMENTS

EP    0906857 A2    4/1999

* cited by examiner

*Primary Examiner* — Mary Cheung
*Assistant Examiner* — Yuen Wong
(74) *Attorney, Agent, or Firm* — David B. Kelley; Brooks Kushman P.C.

(57) ABSTRACT

A vehicle includes a control system configured to implement a method for regenerative braking control. The control system has at least one controller and is configured to control regenerative braking torque to be no greater than a regenerative braking torque limit when a wheel slip of a wheel of the vehicle is above a threshold value. The regenerative braking torque limit is non-zero for at least some values of the wheel slip above the threshold value.

17 Claims, 3 Drawing Sheets

VEHICLE AND METHOD FOR CONTROLLING REGENERATIVE BRAKING

TECHNICAL FIELD

The present invention relates to a method for controlling regenerative braking a vehicle having a control system for implementing such a method.

BACKGROUND

There are driving situations where an anti-lock brake system (ABS) is activated for very short periods, such as hitting a patch of ice or a bump while braking. For such events, the ABS signal can be "ON" for as little as 140 milliseconds. Events such as these may be classified as "improper" ABS activation because of their transient nature. In some regenerative braking control strategies, the regenerative braking torque is set to zero as long as the ABS is "ON"; this includes the transient ABS events described above. This elimination of regenerative braking torque is undesirable in that it reduces the amount of regenerative braking energy that the vehicle can capture, and it is unnecessary for these very transient ABS events. In addition, such a control strategy may include a delay between when the ABS event has ended and when the regenerative braking torque is allowed to be non-zero; this further reduces the potential for capturing regenerative braking energy.

Other control strategies may react to an ABS event by adjusting a target regenerative braking torque so that regenerative braking is controlled to try to exactly meet the target value. This is also inefficient, in that the target value may not represent an optimum amount of regenerative braking that could be captured. Stated another way, forcing the regenerative braking torque to meet a certain target value without destabilizing the vehicle would require constant adjustment of the target value in order to ensure that regenerative braking was being performed at optimum levels. Therefore, a need exists for a vehicle and method for controlling regenerative braking that is able to account for transient ABS events and does control the regenerative braking so that it is forced to meet a target regenerative braking torque.

SUMMARY

At least some embodiments of the present invention include a method for controlling regenerative braking torque in a wheeled vehicle. The method includes controlling regenerative braking torque to be no greater than a regenerative braking torque limit when a wheel slip of a wheel of the vehicle is above a threshold value. The regenerative braking torque limit is non-zero for at least some values of the wheel slip above the threshold value.

At least some embodiments of the present invention include a method for controlling regenerative braking torque in a wheeled vehicle. The method includes controlling regenerative braking torque to be no greater than a regenerative braking torque limit defined by a linear function including a first point based on an initial torque value and a threshold value of a wheel slip of a wheel of the vehicle, and a second point based on a maximum wheel slip value.

At least some embodiments of the present invention include a vehicle having a regenerative braking system and a control system having at least one controller. The control system is configured to control regenerative braking torque to be no greater than a regenerative braking torque limit when a wheel slip of a wheel of the vehicle is above a threshold value. The regenerative braking torque limit is non-zero for at least some values of the wheel slip above the threshold value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
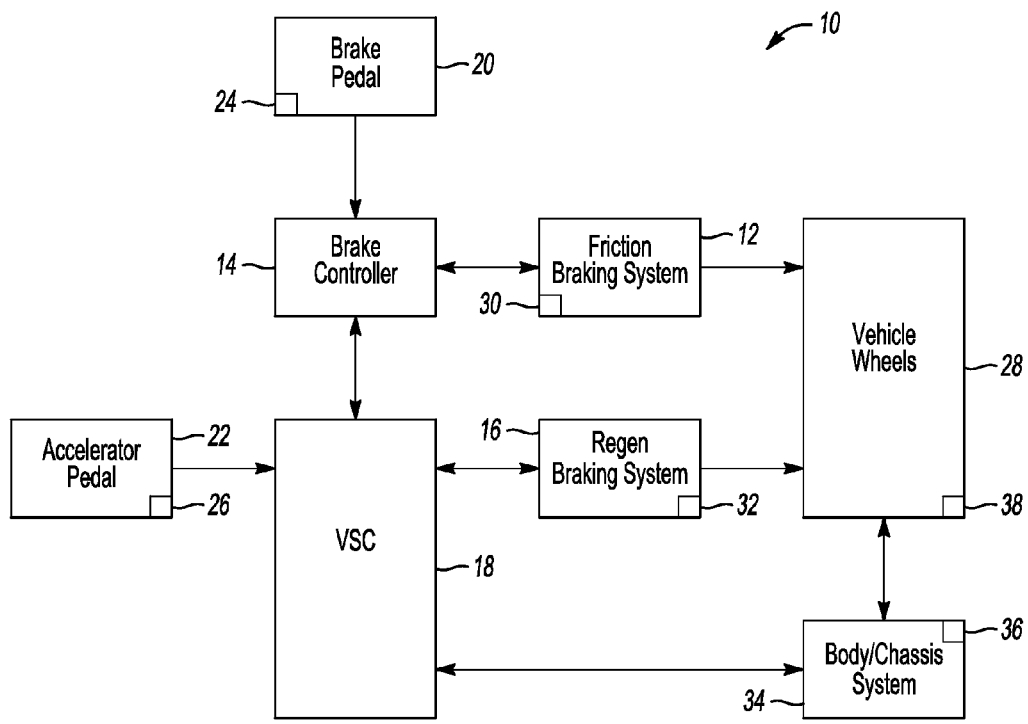
FIG. 1 shows a simplified schematic diagram of a vehicle in accordance with the present invention.

FIG. 1 shows a simplified schematic diagram of a portion of a vehicle 10 in accordance with the present invention. The vehicle 10 includes a friction braking system 12, controlled by a brake controller 14. The vehicle 10 also includes a regenerative braking system 16, which is part of the vehicle powertrain. In particular, the regenerative braking system 16 includes one or more electric machines, such as electric motors, which are operable to provide regenerative braking for the vehicle 10. The regenerative braking system 16 is controlled by a vehicle system controller (VSC) 18. The VSC 18 may include other controllers, such as a powertrain control module (PCM). In fact, the brake controller 14, shown in FIG. 1 as a separate controller, may be integrated into the VSC 18. Thus, the various systems within the vehicle 10 can be controlled by a single controller, separate software controllers within a single hardware device, or a combination of separate software and hardware controllers.

The brake controller 14 receives vehicle operator inputs from a brake pedal 20, and the VSC 18 receives operator inputs from an accelerator pedal 22. In particular, a brake pedal angle sensor 24 (which can be more than one sensor or type of sensor), is configured to detect the position of the brake pedal 20, and send one or more signals to the brake controller 14. Similarly, an accelerator pedal sensor 26 (which can also be more than one sensor), is configured to detect the position of the accelerator pedal 22, and send one or more signals to the VSC 18. The VSC 18 and the brake controller 14 use various inputs, including the inputs from the sensors 24, 26, to decide how to control the friction braking system 12 and the regenerative braking system 16. The friction braking system 12 operates to slow the speed of vehicle wheels 28 through the application of one or more friction elements in accordance with methods well known in the art. Similarly, the regenerative braking system 16 is operable to reduce the speed of the vehicle wheels 28 by having at least one electric motor produce a negative torque which is transferred through the powertrain to the vehicle wheels 28.

The friction braking system 12 includes one or more sensors, represented in FIG. 1 by a single sensor 30. The sensor 30 is configured to send signals to the brake controller 14 related to various conditions within the friction braking system 12. For example, if the friction braking system 12 should experience reduced braking capability, perhaps due to a loss of boost or the loss of a hydraulic circuit, the sensor 30 can communicate this condition to the brake controller 14, which in turn communicates with the VSC 18. Similarly, the regenerative braking system 16 has one or more sensors, represented in FIG. 1 by the sensor 32. The sensor 32 may detect such conditions as motor speed, motor torque, power, etc. The sensor 32 communicates directly with the VSC 18, which can use these inputs in combination with the other inputs to control the braking systems 12, 16.

The vehicle 10 also includes a body/chassis system 34. The body/chassis system 34 includes structural elements of the vehicle 10, including such things as a vehicle suspension system. The vehicle wheels 28, shown separately in FIG. 1, may be considered a part of the larger body/chassis system 34. One or more sensors, shown in FIG. 1 as a single sensor 36, are configured to detect various conditions of the body/chassis system 34, and to communicate with the VSC 18. The sensor 36 may detect such conditions as the deflection of, or the load on, various elements of the body/chassis system 34. Similarly, a sensor 38, which represents one or more sensors, is configured to detect conditions of the vehicle wheels 28, including the wheel speed. The sensor 38 is shown in FIG. 1 communicating with the larger body/chassis system 34, which in turn communicates with the VSC 18. Alternatively, the sensor 38 can be directly connected to the VSC 18.

Figure 2:
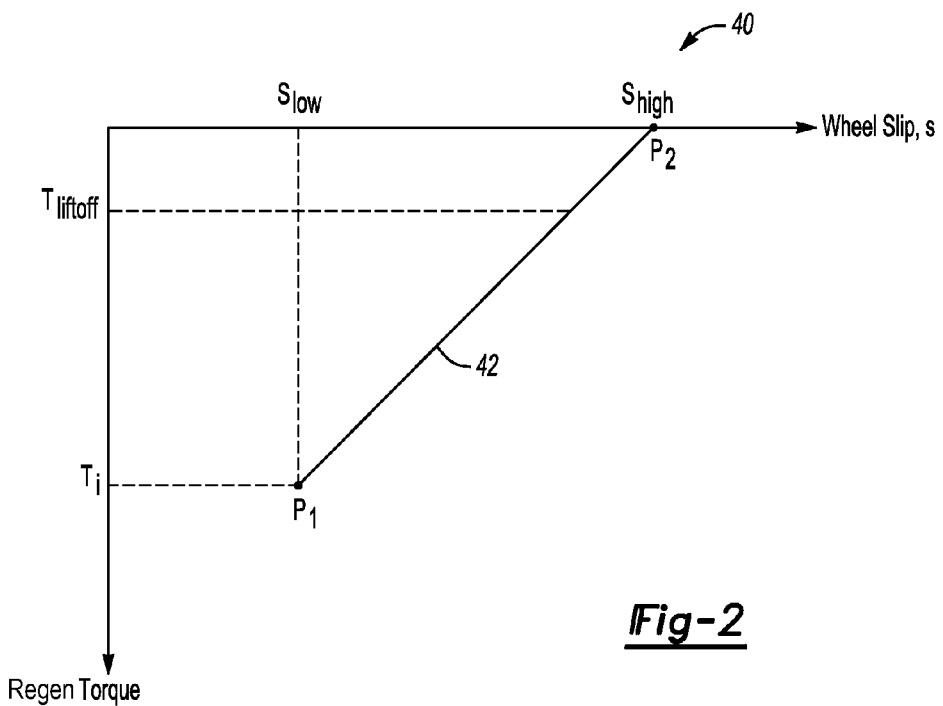
FIG. 2 shows a graph of a regenerative braking torque limiter function in accordance with embodiments of the present invention.

As described herein, one or more of the controllers 14, 18, and optionally in conjunction with one or more other controllers in the vehicle 10, may be programmed to implement a regenerative braking control strategy in accordance with embodiments of the present invention. FIG. 2 shows a graph 40 illustrating a regenerative braking torque limit function in accordance with an embodiment of the present invention. Specifically, the regenerative braking torque limit shown in FIG. 2 is illustrated as a straight line 42, indicating that the regenerative braking torque limit is defined by a linear function. As shown in FIG. 2, the line 42 is a function of an initial torque value ($T_i$) and wheel slip. In general, one or more of the vehicle controllers may implement a method for controlling regenerative braking torque that includes controlling the regenerative braking torque to be no greater than the regenerative braking torque limit, shown in FIG. 2 as line 42.

As shown in FIG. 2, the value of the regenerative braking torque along the horizontal axis is zero—for example the value of the regenerative braking torque is zero at a wheel slip value of $s_{high}$; in contrast, at all other points along the regenerative braking torque limit line 42 the regenerative braking torque is greater than zero. It is understood that regenerative braking torque is a negative torque, and thus when it is said that the regenerative braking torque is "more than" or "greater than" zero, it does not imply that it is a "positive" torque value; rather, it means that the regenerative braking torque has a non-zero value. In broad terms, the regenerative braking torque limit line 42 is defined by two points: a first point ($P_1$) based on the initial torque value ($T_i$) and a threshold value of wheel slip ($s_{low}$), and a second point ($P_2$) based on a maximum wheel slip value ($s_{high}$).

The threshold value of wheel slip ($s_{low}$) is a calibratable value that may be chosen, for example, to be a minimum amount of wheel slip necessary for the regenerative braking control strategy to be implemented. In some embodiments of the present invention, the threshold value may be set to a wheel slip of approximately 5%. In such a case, regenerative braking would not be limited by this control strategy until at least one of the wheels 28 of the vehicle 10 experienced more than 5% slip. Wheel slip may be calculated in any number of ways, including, for example, by using the following formula.

$$\text{Slip} = \frac{\text{RollingRadius} \times \text{WheelSpeed} - \text{VehicleSpeed}}{\text{VehicleSpeed}} \quad \text{Equation 1}$$

Where: RollingRadius=the rolling radius of the wheel,
WheelSpeed=the speed of the wheel, and
VehicleSpeed=the speed of the vehicle across the wheel plane.

Any one or more of these parameters can be measured or estimated depending on the sensors used on the vehicle and the other information available to the controllers.

Similar to the definition of the threshold value of wheel slip ($s_{low}$), the value of wheel slip at $P_2$ ($s_{high}$) is calibratable, and may be chosen to be a maximum wheel slip value that the wheel will be allowed to experience before regenerative braking is controlled to be zero. In some embodiments of the present invention the value of ($s_{high}$) may be chosen, for example, to be 10%. By utilizing wheel slip values, rather than an ABS signal to implement the regenerative braking control strategy, the strategy is proactive and is not responding to an ABS event, which, as described above, could be a transient event where reducing regenerative braking torque to zero would be undesirable. In addition to utilizing wheel slip values rather than ABS signals, the present control strategy utilizes a regenerative braking torque limit rather than forcing the regenerative braking torque to a specific value such as by setting a target value that the regenerative braking torque must meet. This increases the amount of regenerative braking torque that can be captured, by allowing the regenerative braking torque to work unimpeded until it hits the regenerative braking torque limit, and it is only then that it is reduced in accordance with the limit function.

The initial torque value ($T_i$) may itself be a function of a number of parameters, such as, for example, it may be a function of at least regenerative braking and friction braking values at the time the wheel slip reaches the threshold value ($s_{low}$). It may further be a function of a maximum allowable regenerative braking torque, which may be calculated or determined in a number of ways, for example, by being based at least in part on a braking force distribution for the vehicle. The definition of the initial torque value ($T_i$) as a function of different parameters may be illustrated by the following formula.

$$T_i = \max\{T_{lim}, T_{regen} - 0.7 T_{brk}\} \quad \text{Equation 2}$$

Where: $T_{lim}$=a regenerative braking torque limit, based on, for example, vehicle dynamics,
$T_{regen}$=the regenerative braking torque at the slipping wheel, and
$T_{brk}$=the friction braking torque at the slipping wheel.

Thus, in the embodiment shown above, the initial torque value ($T_i$) is the maximum of the regenerative braking toque limit ($T_{lim}$) and the difference of the regenerative braking torque ($T_{regen}$) and 70% of the friction braking torque ($T_{brk}$). As stated above, the value of $T_{lim}$ may be based on vehicle dynamics. More particularly, it can be based on a vehicle parameter such as the braking force distribution between the front and rear axles, which is part of the vehicle dynamics, and which may affect vehicle stability. The parameter $T_{lim}$ may therefore be considered a maximum allowable (desirable) regenerative braking torque for the vehicle. It is worth noting that as used in Equation 2 the "max" function is a true maximum—e.g., if $T_{lim}$ is equal to −1000 Nm and ($T_{regen}$−

$0.7T_{brk}$) is equal to −750 Nm, then the "max" value is −750 Nm, since this is larger than −1000 Nm.

As described above, the regenerative braking torque limit, shown in FIG. 2 as line 42, is a linear function defined by the points ($P_1$) and ($P_2$); however, the function describing the line may take on a number of different forms. In at least some embodiments of the present invention, the regenerative braking torque limit may be described by the following formula.

$$T_{reg\_lim} = \min\left\{T_{liftoff}, T_i\left(\frac{s - s_{high}}{s_{low} - s_{high}}\right)\right\} \qquad \text{Equation 3}$$

Where: $T_{reg\_lim}$=the regenerative braking torque limit, shown as line 42 in the embodiment illustrated in FIG. 2, $T_{liftoff}$=the regenerative braking torque level for a zero accelerator pedal position, s=wheel slip, and $s_{low}$ and $s_{high}$ are as described above.

Thus, $T_{reg\_lim}$ is, in this embodiment, a linear function defined as the minimum of $T_{liftoff}$ and the product of $T_i$ and a ratio of wheel slip differences. In this formula, the value of $T_{liftoff}$ may be a function, for example, of vehicle speed, and may be determined by the vehicle control system via a lookup table. With the accelerator pedal completely disengaged, the liftoff torque ($T_{liftoff}$) represents an amount of engine compression braking torque anticipated at the particular vehicle speed. The value of the wheel slip (s) may be calculated, for example, using Equation 1 as described above. Similar to the "max" function used in Equation 2 above, the "min" function used in Equation 3 is a true minimum—i.e., as between −1000 Nm and −750 Nm, the minimum is −1000 Nm.

Figure 3A:
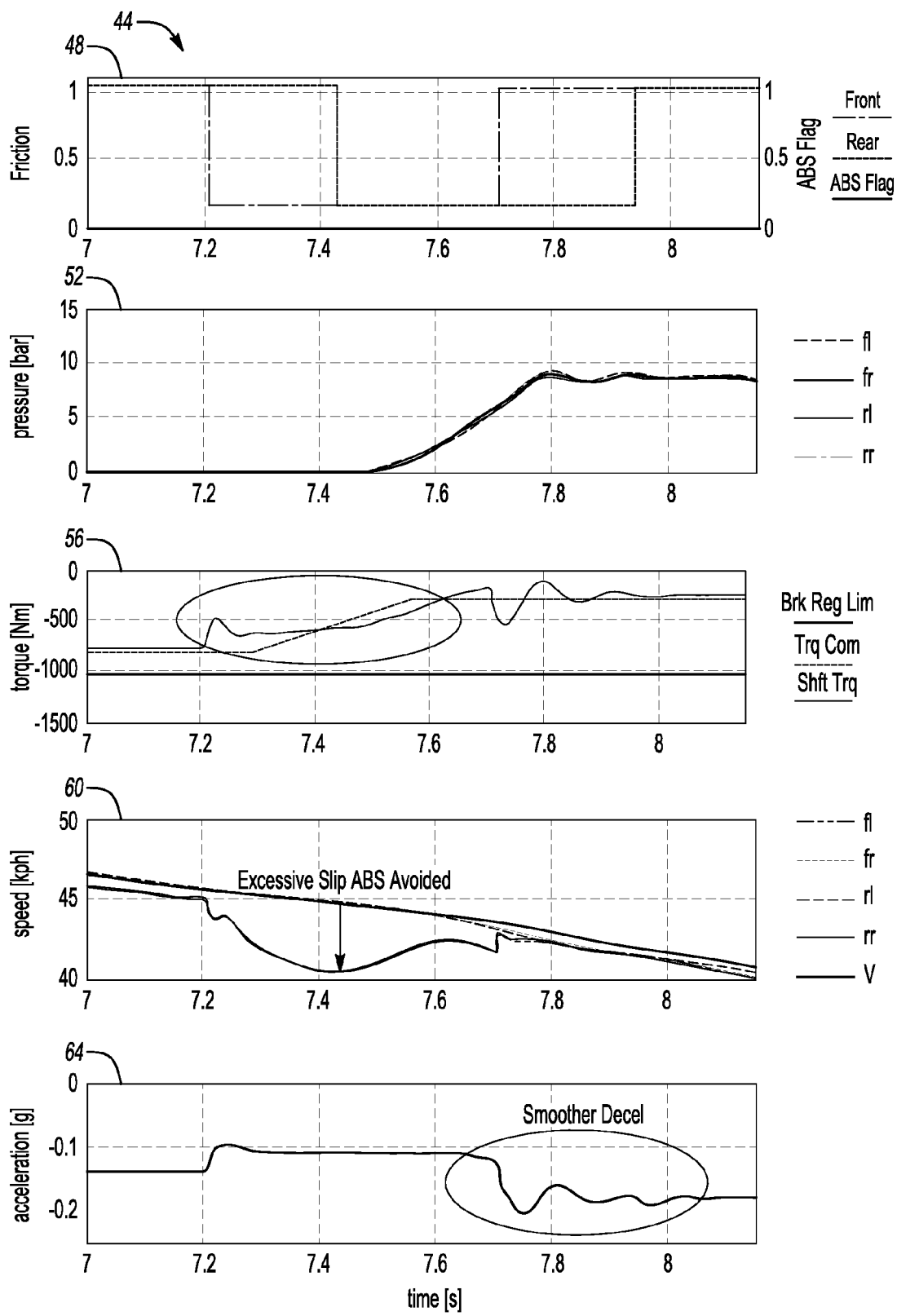
FIGS. 3A and 3B show graphs of various vehicle parameters subject to a control strategy in accordance with embodiments of the present invention vis-à-vis an ABS control strategy.
Figure 3B:
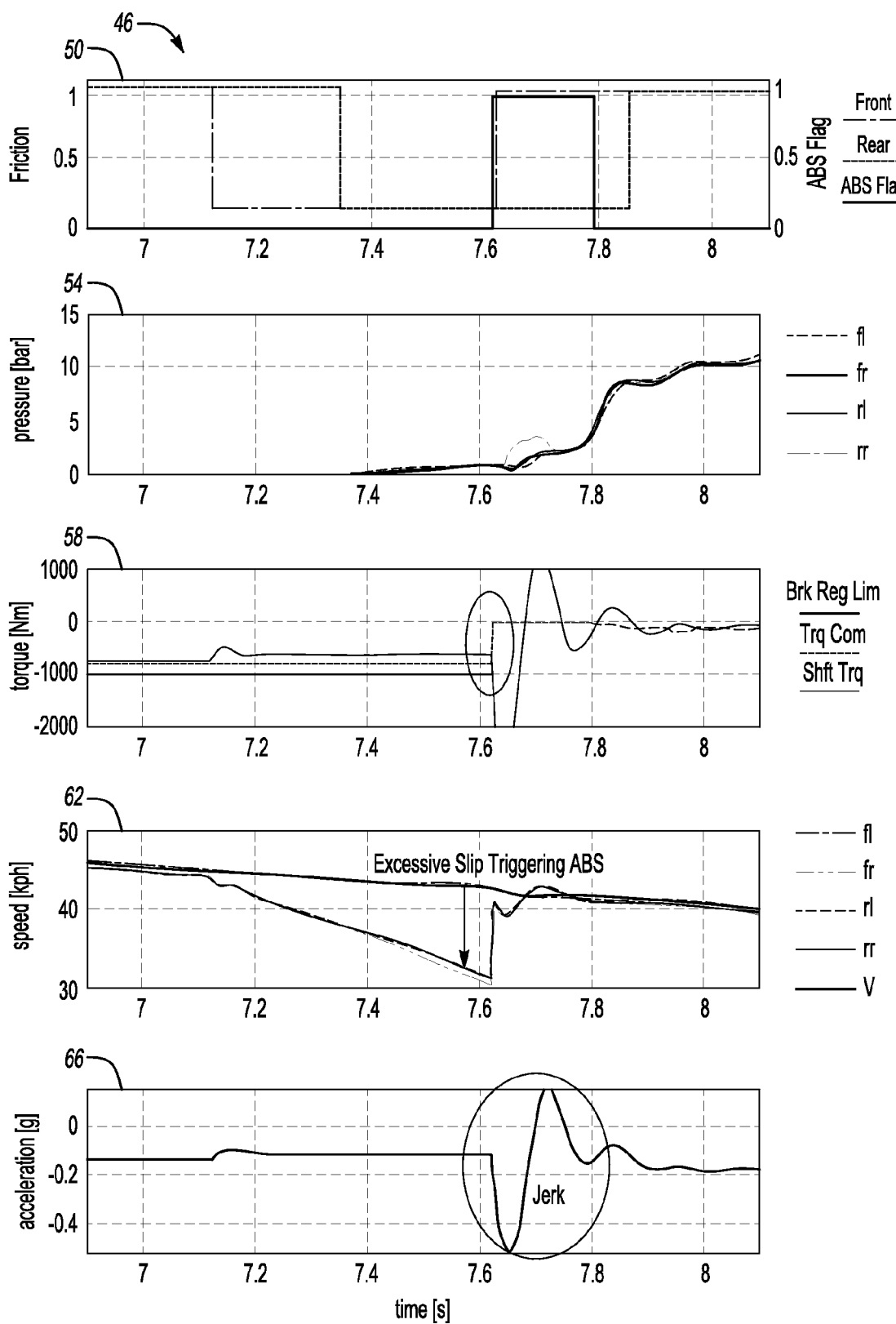

Turning to FIG. 3, FIG. 3A shows an embodiment of the present invention illustrated as a series of graphs 44, while FIG. 3B shows a series of graphs 46, which provide a comparison by illustrating a reactive control system based on ABS signals, instead of wheel slip like the embodiment of the present invention shown in FIG. 3A. In each case, the top graphs 48, 50 represent a friction coefficient for the vehicle wheels and also indicate whether the ABS signal is activated. The graphs 52, 54 represent an amount of pressure on the friction brakes—e.g., caliper pressure—during the braking event. The graphs 56, 58 represent various torque levels. For example, the parameter shown in graph 56 "Brk Reg Lim" is equivalent to the parameter $T_{lim}$ described in Equation 2 above; it does not represent the regenerative braking torque limit function implemented by embodiments of the present invention. The parameter "Trq Com" is the motor torque command at the wheel level, and the parameter "Shft Trq" is the total half shaft torque. The graphs 60, 62 represent speeds for each of the four wheels and the vehicle, and finally, the graphs 64, 66 represent vehicle acceleration.

As shown in the graph 50, the ABS flag is activated at approximately 7.6 seconds; in contrast, it is not activated at all in the graph 48. As described below, the control system of the present invention is implemented in such a way that the ABS flag is never activated. Looking at FIG. 3A exclusively, it is shown that wheel slip begins to occur at approximately 7.2 seconds, as indicated by the wheel speed shown in graph 60 and the reduction in friction coefficient for the rear wheels shown in graph 48. At about 7.3 seconds the torque command (Trq Com) controlling regenerative braking torque begins to be reduced. It is important to note that the regenerative braking torque is not being commanded to a particular level, but rather, it is being limited to a maximum level such as described in detail above with regard to the regenerative braking torque limit function.

As a result of implementing the regenerative braking control strategy, the wheel slip is limited so that the ABS flag is never activated—see graph 48. In contrast, the system utilized in FIG. 3B does not begin to control regenerative braking torque until the ABS flag is activated at approximately 7.6 seconds—see graphs 50 and 58. By this time, excessive wheel slip has occurred and the ABS flag has been triggered—see graph 62. The end result of implementing the control strategy of the present invention is clearly illustrated in a comparison of the graphs 64 and 66. In the graph 64, there is a relatively smooth deceleration that occurs between approximately 7.7 seconds and 8 seconds, which does not adversely impact driver comfort. In contrast, the reactive system shown in FIG. 3B results in a very sharp deceleration just after 7.6 seconds when the regenerative braking torque is commanded to be reduced to zero. As shown in the graph 56, use of a regenerative braking torque limit, at least for this example, did not ever require regenerative braking torque to be reduced completely to zero. Even if a particular event does require the control strategy to limit the regenerative braking torque to zero, the limit is implemented in a controlled fashion that does not adversely impact the driver or vehicle occupants.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling regenerative braking torque in a wheeled vehicle having a regenerative braking system, comprising:

generating the regenerative braking torque for the wheeled vehicle with the regenerative braking system; and limiting the regenerative braking torque using at least one controller to be no greater than a regenerative braking torque limit based on at least an initial torque value and a wheel slip when the wheel slip is above a threshold value, wherein the regenerative braking torque limit is non-zero for at least some values of the wheel slip above the threshold value.

2. The method of claim 1, wherein the regenerative braking torque limit is further a function of a liftoff torque defined as an amount of engine compression braking torque occurring when an accelerator pedal of the wheeled vehicle is not engaged.

3. The method of claim 1, wherein the initial torque value is a function of at least regenerative braking and friction braking values at the time the wheel slip reaches the threshold value.

4. The method of claim 3, wherein the initial torque value is further a function of a maximum allowable regenerative braking torque based at least in part on a braking force distribution for the wheeled vehicle.

5. The method of claim 1, wherein the regenerative braking torque limit is defined by a linear function.

6. The method of claim 5, wherein the linear function is defined by a first point based on an initial torque value and the threshold value, and a second point based on a maximum wheel slip value.

7. The method of claim 6, wherein the value of the regenerative braking torque limit is zero at the maximum wheel slip value.

8. A method for controlling regenerative braking torque in a wheeled vehicle having a regenerative braking system, comprising:
   generating the regenerative braking torque for the wheeled vehicle with the regenerative braking system; and
   limiting the regenerative braking torque using at least one controller to be no greater than a regenerative braking torque limit defined by a linear relationship including a first point based on an initial torque value and a threshold value of a wheel slip, and a second point based on a maximum wheel slip value,
   wherein the value of the regenerative braking torque limit at the first point is greater than zero and the value of the regenerative braking torque limit at the second point is zero.

9. The method of claim 8, wherein the linear relationship is in part defined by an amount of engine compression braking torque occurring when an accelerator pedal of the wheeled vehicle is not engaged.

10. The method of claim 8, wherein the initial torque value is a function of at least regenerative braking and friction braking values at the time the wheel slip reaches the threshold value.

11. The method of claim 10, wherein the initial torque value is further a function of a maximum allowable regenerative braking torque based at least in part on a braking force distribution for the wheeled vehicle.

12. A wheeled vehicle having a regenerative braking system operable to generate regenerative braking torque, comprising:
   a control system having at least one controller,
   the control system limiting the generted regenerative braking torque to be no greater than a regenerative braking torque limit when a wheel slip is above a threshold value, and
   wherein the regenerative braking torque limit is non-zero for at least some values of the wheel slip above the threshold value, and the regenerative braking torque limit is based on at least an initial torque value and the wheel slip.

13. The wheeled vehicle of claim 12, wherein the regenerative braking torque limit is further a function of a liftoff torque defined as an amount of engine compression braking torque occurring when an accelerator pedal of the vehicle is not engaged.

14. The wheeled vehicle of claim 12, wherein the initial torque value is a function of at least regenerative braking and friction braking values at the time the wheel slip reaches the threshold value.

15. The wheeled vehicle of claim 14, wherein the initial torque value is further a function of a maximum allowable regenerative braking torque based at least in part on a braking force distribution for the vehicle.

16. The wheeled vehicle of claim 12, wherein the regenerative braking torque limit is defined by a linear function including a first point based on an initial torque value and the threshold value, and a second point based on a maximum wheel slip value.

17. The wheeled vehicle of claim 16, wherein the value of the regenerative braking torque limit is zero at the maximum wheel slip value.

* * * * *